United States Patent [19]

Kassel et al.

[11] Patent Number: 5,718,453
[45] Date of Patent: Feb. 17, 1998

[54] KNEE PROTECTION DEVICE HAVING A LOAD DISTRIBUTOR FOR A MOTOR VEHICLE

[75] Inventors: Armin Kassel, Heimsheim; Bernhard Holzapfel, Remshalden; Georg Bauer, Heilbronn; Ulrich Gerber, Wildberg; Santiago Duenas, Ammerbuch, all of Germany

[73] Assignee: Mercedes-Benz AG, Stuttgart, Germany

[21] Appl. No.: 689,349

[22] Filed: Aug. 8, 1996

[30] Foreign Application Priority Data

Dec. 23, 1995 [DE] Germany ............... 195 48 712.5

[51] Int. Cl.⁶ ................................................ B60R 21/055
[52] U.S. Cl. ................................. 280/752; 280/748
[58] Field of Search ................................ 280/748, 751, 280/752

[56] References Cited

U.S. PATENT DOCUMENTS

| | | | |
|---|---|---|---|
| 3,817,553 | 6/1974 | Wilfert | 280/752 |
| 4,638,901 | 1/1983 | Kojima | 280/748 |
| 4,893,834 | 1/1990 | Honda et al. | 280/751 |
| 4,978,136 | 12/1990 | Tomita et al. | 280/751 |
| 5,273,314 | 12/1993 | Sakakibara | 280/752 |
| 5,456,494 | 10/1995 | Witkovsky | 280/752 |
| 5,577,770 | 11/1996 | Sinner et al. | 280/752 |

FOREIGN PATENT DOCUMENTS 30 10 817 A1   10/1980   Germany.

Primary Examiner—Kenneth R. Rice
Attorney, Agent, or Firm—Evenson, McKeown, Edwards & Lenahan, P.L.L.C.

[57] ABSTRACT

A knee protection device in a motor vehicle having a dimensionally stable, cushioned and essentially plate-shaped load distributor which is supported on the end side by curved deformable holders on a cross member fixed to the vehicle. The energy absorption capacity of the two holders is fully utilized by spanning a reinforcement on the back side of the load distributor. The reinforcement has an approximately hat-shaped cross-section, extends at least near the holders and has outwardly projecting flanges which are connected with the load distributor.

14 Claims, 1 Drawing Sheet

KNEE PROTECTION DEVICE HAVING A LOAD DISTRIBUTOR FOR A MOTOR VEHICLE

BACKGROUND AND SUMMARY OF THE INVENTION

This invention relates to a knee protection device in a motor vehicle having a dimensionally stable, cushioned and essentially plate-shaped load distributor which is supported on the end side by way of curved deformable holders on a vehicle-fixed cross member.

A knee protection device of this type, in the case of which the holders deform during a knee impact on the load distributor while absorbing energy, is known from Tomita et al., U.S. Pat. No. 4,978,136. The load distributor must have a stiff construction so that the holders deform in their constructively predetermined direction which yields a maximum energy absorption. In order to achieve this dimensional stability of the load distributor, it is known to bend it and to provide it with beads. The endeavors to stiffen the load distributor by deforming measures are limited so that it may happen that the energy absorption capacity of the members cannot be fully exhausted because the load distributor experiences a strong deformation.

It is an object of the invention to ensure by simple measures that also, in the case of a very high local stressing of the load distributor, it is not subjected to any deformation so that the energy absorption capacity of the holders supporting it can be fully exhausted.

This and other objects have been achieved according to the present invention by providing a knee protection device in a motor vehicle comprising a dimensionally stable, cushioned and essentially plate-shaped load distributor; curved deformable holders supported on a vehicle-fixed cross member, said holders being arranged and configured to support respective lateral ends of said load distributor; and a reinforcement connected to a rear side of the load distributor, said reinforcement extending laterally to proximate said holders and having an approximately hat-shaped cross-section comprising outwardly projecting flanges, said flanges being connected with said load distributor.

A particularly good integration of the holders is achieved when the reinforcement extends along the entire length of the load distributor. The reinforcement may be notched in the area of the holders in order to allow the holders to extend through the reinforcement.

In this connection, the introduction of force into the holders is further improved if the reinforcement is connected with the holders.

A targeted increase of the moment of resistance and thus a conducting of force to a predetermined point is achieved by varying the profile width and/or the profile height of the reinforcement along its longitudinal course. According to one preferred embodiment of the invention, the profile height changes continuously so that the moment of resistance increases constantly in the direction of the larger profile height. It will then be possible, for example, based upon space availability, to use holders with a different deformation capacity and to act upon these with respect to force as the result of the required profile construction of the reinforcement in such a manner that the maximally possible deformation capacity is exhausted without any local failure of the knee protection device.

Preferred cross-sectional forms of the reinforcement are in this case approximately V-shaped, approximately U-shaped or approximately semicircular.

The object of the invention will be explained in the following in reference to a knee protection device assigned to the front passenger side of a motor vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
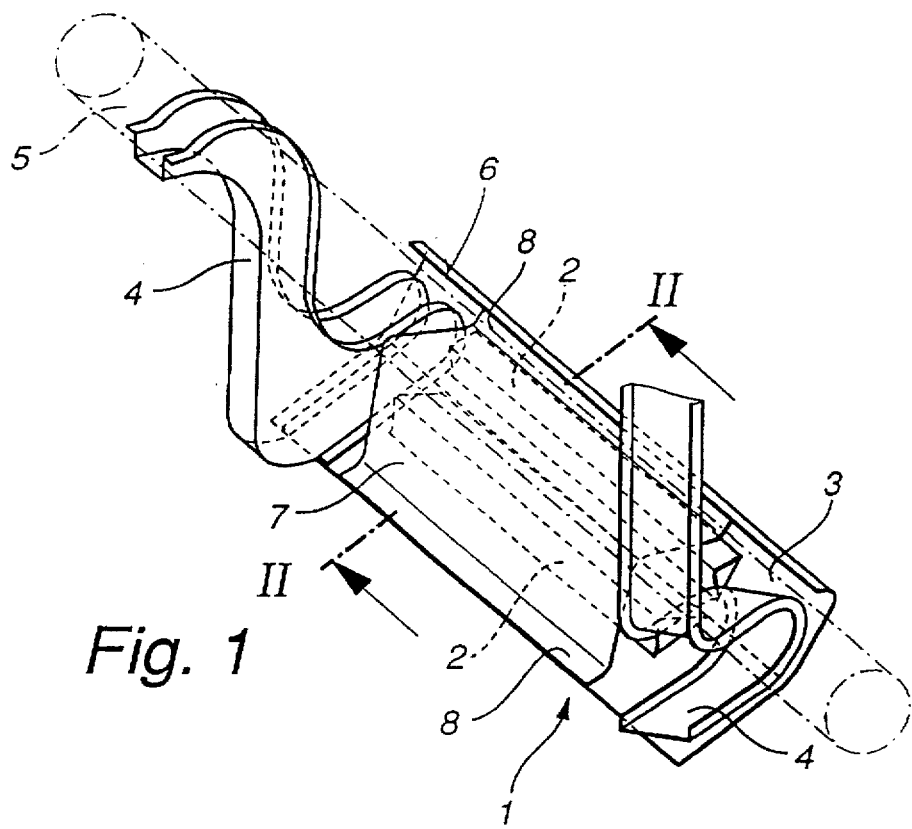
FIG. 1 is a perspective view of a reinforced load distributor according to a preferred embodiment of the present invention, which is supported by two end-side holders in a fixed manner on the vehicle body.

A knee protection device 1, which, on the front passenger side, is assigned to a dashboard in a motor vehicle which is not shown, comprises a dimensionally stable, plate-shaped load distributor 3. The load distributor 3 is stiffened by impressed longitudinal beads 2, and is supported at its lateral end areas by respective curved holders 4, which are deformable in a targeted manner, and are fixed on a cross member 5 of the vehicle body.

The load distributor 3 is cushioned on its front side 6 (generally facing toward the rear of the motor vehicle) in a manner which is not shown. On the rear side (generally facing toward the front of the motor vehicle) of the load distributor 3 a reinforcement 7 is disposed which has an approximately hat-shaped cross-section and which, in the illustrated embodiment, extends near the holders 4. The reinforcement 7 is fixedly connected with the load distributor 3 by means of its flanges 8 projecting to the outside. However, it is also contemplated to extend the reinforcement to the holders 4 or past the holders 4 and to connect the reinforcement to the holders, whereby a particularly advantageous introduction of force into the holders 4 is achieved in the case of a knee impact. The reinforcement 7 may be connected to the holders 4 by welding, by brackets, or in other known ways.

The holders 4 of the same device may have different deformation capacities with different response thresholds because of the maximally possible dimensioning and/or alignment, due to space limitations. In such a case, when a load is applied, the energy absorption capacity of one holder 4 may be almost exhausted at the same time that the deformation of the other holder 4 has not yet started. In order to effectively deal with this circumstance when such a condition exists, the cross-sectional shape of the reinforcement 7 placed on the rear side of the load distributor 3 is varied in a targeted manner. In particular, the profile height is increased constantly along the longitudinal length of the reinforcement in a direction toward the holder 4 which has a higher energy absorption capacity. With an increasing profile height, the moment of resistance will also increase so that in this manner a larger force potential can be introduced into the assigned higher-stressable holder and both holders 4 are therefore uniformly deformed while absorbing energy.

Figure 2:
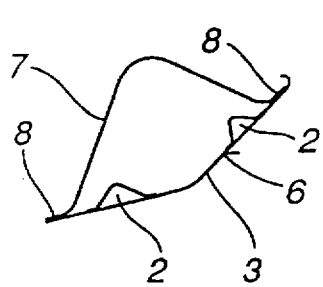
FIGS. 2 to 4 are respective sectional views along the Line II—II in FIG. 1 with different cross-sectional shapes of the reinforcement.
Figure 3:
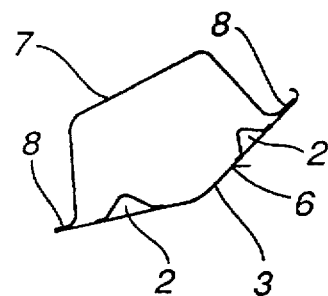
Figure 4:
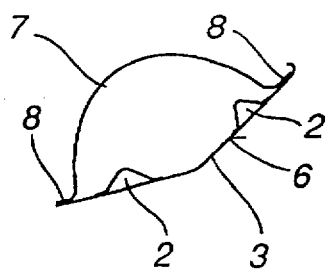

In this case, the design of the cross-section of the reinforcement 7 which is generally approximately hat-shaped, can be changed within wide limits, in which case cross-sectional forms having an approximately V-shape as shown in FIG. 2, an approximately U-shape, as shown in FIG. 3, or an approximately semicircular form, as shown in FIG. 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Knee protection device in a motor vehicle comprising:

a dimensionally stable, cushioned and essentially plate-shaped load distributor;

curved deformable holders supported on a vehicle-fixed cross member, said holders being arranged and configured to support respective lateral ends of said load distributor; and a reinforcement connected to a rear side of the load distributor, said reinforcement extending laterally to proximate said holders and having an approximately hat-shaped cross-section comprising outwardly projecting flanges, said flanges being connected with said load distributor.

2. Knee protection device according to claim 1, wherein the reinforcement extends along an entire length of the load distributor.

3. Knee protection device according to claim 2, wherein the reinforcement is notched to allow the holders to extend through the reinforcement.

4. Knee protection device according to claim 2, wherein the reinforcement is connected with the holders.

5. Knee protection device according to claim 3, wherein the reinforcement is connected with the holders.

6. Knee protection device according to claim 1, wherein at least one of a profile width and a profile height of the reinforcement changes along a longitudinal course of the reinforcement.

7. Knee protection device according to claim 2, wherein at least one of a profile width and a profile height of the reinforcement changes along a longitudinal course of the reinforcement.

8. Knee protection device according to claim 4, wherein at least one of a profile width and a profile height of the reinforcement changes along a longitudinal course of the reinforcement.

9. Knee protection device according to claim 6, wherein said profile height changes continuously along said longitudinal course.

10. Knee protection device according to claim 7, wherein said profile height changes continuously along said longitudinal course.

11. Knee protection device according to claim 8, wherein said profile height changes continuously along said longitudinal course.

12. Knee protection device according to claim 1, wherein the cross-section of the reinforcement is approximately V-shaped.

13. Knee protection device according to claim 1, wherein the cross-section of the reinforcement is approximately U-shaped.

14. Knee protection device according to claim 1, wherein the cross-section of the reinforcement is approximately semicircular.

* * * * *